(12) United States Patent
Xie et al.

(10) Patent No.: US 11,113,546 B2
(45) Date of Patent: Sep. 7, 2021

(54) LANE LINE PROCESSING METHOD AND DEVICE

(71) Applicant: Baidu Online Network Technology (Beijing) Co., Ltd., Beijing (CN)

(72) Inventors: Shufu Xie, Beijing (CN); Yuqiang Zhai, Beijing (CN); Tian Xia, Beijing (CN); Yu Ma, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 14 days.

(21) Appl. No.: 16/521,028

(22) Filed: Jul. 24, 2019

(65) Prior Publication Data
US 2020/0074189 A1 Mar. 5, 2020

(30) Foreign Application Priority Data
Sep. 4, 2018 (CN) .......................... 201811025492.4

(51) Int. Cl.
*G06K 9/00* (2006.01)
*G06T 7/70* (2017.01)
*G06N 20/00* (2019.01)

(52) U.S. Cl.
CPC ......... *G06K 9/00798* (2013.01); *G06N 20/00* (2019.01); *G06T 7/70* (2017.01); *G06T 2207/30256* (2013.01)

(58) Field of Classification Search
CPC ......... G06K 9/00798; G06T 7/13; G06T 7/70; G06T 7/181; G06T 2207/30256; G06N 3/08; G06N 20/00
See application file for complete search history.

(56) References Cited

U.S. PATENT DOCUMENTS 9,082,014 B2 7/2015 Terrazas et al.
9,812,838 B2 11/2017 Villeneuve et al.
(Continued)

FOREIGN PATENT DOCUMENTS

CN 102663196 A 9/2012
CN 103258338 A 8/2013
(Continued)

OTHER PUBLICATIONS

Xiaohu Lu, Pairwise Linkage for Point Cloud Segmentation (Year: 2016).*
(Continued)

*Primary Examiner* — Edward F Urban
*Assistant Examiner* — Wassim Mahrouka
(74) *Attorney, Agent, or Firm* — Patterson Thuente Pedersen, P.A.

(57) ABSTRACT

A lane line processing method and device are provided. The method can includes obtaining distances between lane line points in a first image, determining direction densities of the individual lane line points by using the distances between the lane line points, dividing lane line points into groups corresponding to lane lines by using the direction densities of the individual lane line points, and obtaining representation information of the lane lines corresponding to the groups by using the lane line points in the groups. By using the direction densities of the individual lane line points, lane line points in an image are divided into groups, the obtained groups are then more accurate, and thus the lane lines obtained by fitting are accurate, are less susceptible to image quality issues, and have high robustness.

17 Claims, 5 Drawing Sheets selecting a target lane line point and K lane line points, wherein a distance from each of the K lane line points to the target lane line point is less than a first threshold, K is a positive integer greater than or equal to 1 — S121 generating a plurality of straight lines, wherein each of the straight lines passes through the target lane line point and at least one of the K lane line points — S122 obtaining, for a respective straight line, the number of relevant lane line points, wherein a distance from each relevant lane line point to the respective straight line is less than a second threshold — S123 determining a maximum of numbers of the relevant lane line points corresponding to the respective straight line, as a direction density of the target lane line point — S124

(56) References Cited

U.S. PATENT DOCUMENTS

2015/0242699 A1* 8/2015 Wang .................. G06K 9/4633
382/170
2017/0092000 A1 3/2017 Schwimmer

FOREIGN PATENT DOCUMENTS

| | | | | |
|---|---|---|---|---|
| CN | 103914830 | A | | 7/2014 |
| CN | 104020674 | A | | 9/2014 |
| CN | 104183014 | A | | 12/2014 |
| CN | 104376297 | A | | 2/2015 |
| CN | 104457569 | A | | 3/2015 |
| CN | 104766058 | A | * | 7/2015 |
| CN | 104899855 | A | | 9/2015 |
| CN | 104933856 | A | | 9/2015 |
| CN | 104950883 | A | | 9/2015 |
| CN | 105046235 | A | * | 11/2015 ........... G06N 3/0454 |
| CN | 105761308 | A | | 7/2016 |
| CN | 105844600 | A | | 8/2016 |
| CN | 106462757 | A | | 2/2017 |
| CN | 106599832 | A | | 4/2017 |
| CN | 106919908 | A | | 7/2017 |
| CN | 107103627 | A | | 8/2017 |
| CN | 107103627 | A | * | 8/2017 |
| CN | 107657237 | A | | 2/2018 |
| CN | 107678306 | A | | 2/2018 |
| CN | 107818293 | A | | 3/2018 |
| CN | 107832806 | A | | 3/2018 |
| CN | 107993512 | A | | 5/2018 |
| CN | 108256506 | A | | 7/2018 |
| CN | 108492356 | A | | 9/2018 |
| JP | 2017091273 | A | | 5/2017 |
| JP | 2018060512 | A | | 4/2018 |
| KR | 20160047087 | A | | 5/2016 |
| RO | 132599 | A2 | | 5/2018 |
| TW | 200945245 | A | | 11/2009 |
| TW | 201643063 | A | | 12/2016 |

OTHER PUBLICATIONS

XU Fangfang, Real-Time Lane Detection for Intelligent Vehicles Based on Monocular Vision (Year: 2012).*
Fuat Coşkun, Real Time Lane Detection and Tracking System Evaluated in a Hardware-in-The-Loop Simulator (Year: 2010).*
Alex Rodriguez and Alessandro Laio, Clustering by fast search and find of density peaks (Year: 2014).*
CN 201811025492.4, First Office Action dated May 16, 2019, 10 pages.
CN 201811025492.4, Search Report dated May 10, 2019, 4 pages.
CN 201811025492.4, Second Office Action dated May 16, 2019, 10 pages.
CN 201811025492.4, Supplementary Search Report dated Jul. 1, 2019, 4 pages.
CN 201811025492.4, Third Office Action dated Sep. 19, 2019, 7 pages.
Notification to Grant Patent Right for Invention, Application No. 201811025492.4, dated Dec. 9, 2019, 3 pages.
Search Report, Chinese Application No. 2018110254924, dated Dec. 2, 2019, 4 pages.
Extended European Search Report, Application No. 19187440.3, dated Dec. 10, 2019, 13 pages.
Xiaohu Lu et al., "Pairwise Linkage for Point Cloud Segmentation," ISPRS Annals of Photogrammetry, Remote Sensing and Spatial Information Sciences, vol. III-3, Jun. 3, 2016, pp. 201-208, XP055647625, DOI: 10.5194/isprs-annals-III-3-201-2016.

* cited by examiner

LANE LINE PROCESSING METHOD AND DEVICE

CROSS-REFERENCE TO RELATED APPLICATION

This application claims priority to Chinese Patent Application No. 201811025492.4, filed on Sep. 4, 2018, which is hereby incorporated by reference in its entirety.

TECHNICAL FIELD

The present disclosure relates to the technical field of transportation, and in particular, to a lane line processing method and a lane line processing device.

BACKGROUND

Lane lines play an important role in automatic, or autonomous, driving, and can provide important information to be output to modules of autonomous vehicle piloting systems, such as positioning modules, decision modules and control modules. For a two-dimensional (2D) image captured by a camera, according to conventional schemes, edges of lane lines are detected by using an image processing method, and then the lane lines are acquired or identified by using a clustering or other point-grouping scheme.

According to schemes for detecting or segmenting lane lines by using conventional image processing methods, deep learning methods and other methods, a cumbersome post-processing scheme is required to output lane lines. However, the effects are still susceptible to image quality and other conditions. One examples of a cumbersome post-processing scheme used by conventional methods is to post-process lane lines by using the Hough transform, which is susceptible to noise points and is not robust.

SUMMARY

According to embodiments of the present disclosure, a lane line processing method and a lane line processing device are provided to solve one or more technical problems in the conventional technologies.

In a first aspect, according to an embodiment of the present disclosure, a lane line processing method is provided. The method can include obtaining distances between lane line points in a first image, determining direction densities of the individual lane line points by using the distances between the lane line points, dividing lane line points into groups corresponding to lane lines by using the direction densities of the individual lane line points, and obtaining representation information of the lane lines corresponding to the groups by using the lane line points in the groups.

In embodiments, the method can further include inputting the first image to a deep learning model to obtain a second image, wherein there is a scaling ratio between the first image and the second image, and wherein the second image comprises lane line points and non-lane line points obtained by identifying the first image in the deep learning model, and mapping coordinates of the lane line points in the second image back to the first image according to the scaling ratio, to obtain coordinates of the lane line points in the first image.

In embodiments, determining direction densities of the individual lane line points by using the distances between the lane line points can include selecting a target lane line point and K lane line points, wherein a distance from each of the K lane line points to the target lane line point is less than a first threshold, K is a positive integer greater than or equal to 1, generating a plurality of straight lines, wherein each of the straight lines passes through the target lane line point and at least one of the K lane line points, obtaining, for a respective straight line, the number of relevant lane line points, wherein a distance from each relevant lane line point to the respective straight line is less than a second threshold, and determining a maximum of numbers of the relevant lane line points corresponding to the respective straight line, as a direction density of the target lane line point.

In embodiments, dividing lane line points into groups corresponding to lane lines by using the direction densities of the individual lane line points can include determining a candidate lane line point of a selected one of the groups, determining, in the first image, a lane line point belonging to the selected group, according to the direction densities of the individual lane line points, adding the determined lane line point into the selected group, and taking the added lane line point as a new candidate lane line point, and continuing the determining a lane line point belonging to the selected group, until no lane line point belonging to the one of the groups is determined. Determining, in the first image, a lane line point belonging to the one of the groups, according to the direction densities of the individual lane line points can include selecting M lane line points from the first image, wherein a distance from each of the M lane line points to the candidate lane line point is less than a third threshold, M is a positive integer greater than or equal to 1, and determining lane line points belonging to the selected group according to the direction densities of the M lane line points.

In embodiments, determining, in the first image, a lane line point belonging to the one of the groups, according to the direction densities of the M lane line points can include determining a lane line point having the maximum direction density among the M lane line points as the lane line point belonging to the one of the groups, or obtaining, from the M lane line points, relevant lane line points of a straight line corresponding to a direction density of the candidate lane line point, and selecting a point having the maximum direction density from the obtained relevant lane line points as the lane line point belonging to the one of the groups.

In embodiments, obtaining representation information of the lane lines corresponding to the groups by using the lane line points in the groups can include selecting, for each group, a plurality of lane line points, and performing polynomial fitting on coordinates of the selected plurality of lane line points in the first image, to obtain a polynomial curve of a lane line corresponding to the group.

In embodiments, obtaining representation information of the lane lines corresponding to the groups by using the lane line points in the groups further can include determining coordinates of start points and/or coordinates of end points of the lane line by using the polynomial curve of the lane line.

In embodiments, the method can further include merging the lane line points in one of the groups.

In embodiments, obtaining distances between lane line points in a first image can include calculating distances between lane line points according to coordinates of the lane line points in the first image, and generating a distance matrix by using the distances between lane line points, wherein an element in the distance matrix represents a distance between two lane line points in the first image.

In a second aspect, according to an embodiment of the present disclosure lane line processing device is provided. The lane line processing device can include a distance obtaining module configured to obtain distances between lane line points in a first image, a direction density module configured to determine direction densities of the individual lane line points by using the distances between the lane line points, a grouping module, configured to divide lane line points into groups corresponding to lane lines by using the direction densities of the individual lane line points, and a lane line representing module configured to obtain representation information of the lane lines corresponding to the groups by using the lane line points in the groups.

In embodiments, the device can further include an identification module, configured to input the first image to a deep learning model to obtain a second image, wherein there is a scaling ration between the first image and the second image, and wherein the second image comprises lane line points and non-lane line points obtained by identifying the first image in the deep learning model, and a mapping module, configured to map coordinates of the lane line points in the second image back to the first image according to the scaling ratio, to obtain coordinates of the lane line points in the first image.

In embodiments, the direction density module can be further configured to select a target lane line point and K lane line points, wherein a distance from each of the K lane line points to the target lane line point is less than a first threshold, K is a positive integer greater than or equal to 1, generate a plurality of straight lines, wherein each of the straight lines passes through the target lane line point and at least one of the K lane line points, obtain, for a respective straight line, the number of relevant lane line points, wherein a distance from each relevant lane line point to the respective straight line is less than a second threshold and determine a maximum of numbers of the relevant lane line points corresponding to the respective straight line, as a direction density of the target lane line point.

In embodiments, the grouping module can be further configured to determine a candidate lane line point of one of the groups, determine, in the first image, a lane line point belonging to the one of the groups, according to the direction densities of the individual lane line points, add the determined lane line point into the one of the groups, and take the added lane line point as a new candidate lane line point, and continue the determining a lane line point belonging to the one of the groups, until no lane line point belonging to the one of the groups is determined.

Determining, in the first image, a lane line point belonging to the one of the groups, according to the direction densities of the individual lane line points can include selecting M lane line points from the first image, wherein a distance from each of the M lane line points to the candidate lane line point is less than a third threshold, M is a positive integer greater than or equal to 1; and determining lane line points belonging to the one of the groups according to the direction densities of the M lane line points.

In embodiments, the lane line representing module can include a fitting sub-module configured to select, for each group, a plurality of lane line points, and perform polynomial fitting on coordinates of the selected plurality of lane line points in the first image to obtain a polynomial curve of a lane line corresponding to the group.

In embodiments, the lane line representing module can further include a start and end point sub-module configured to determine coordinates of start points and/or coordinates of end points of the lane line by using the polynomial curve of the lane line.

In embodiments, the distance obtaining module can include a distance calculation sub-module, configured to calculate distances between lane line points according to coordinates of the lane line points in the first image, and a distance matrix generation sub-module, configured to generate a distance matrix by using the distances between lane line points, wherein an element in the distance matrix represents a distance between two lane line points in the first image.

In embodiments, a lane line processing device is provides. The functions the device may be implemented by using hardware or corresponding software executed by hardware. The hardware or software includes one or more modules corresponding to the functions described herein.

In a possible design, the device includes a processor and a memory for storing a program which supports the device in executing the lane line processing method described above, and the processor is configured to execute the program stored in the memory. The device can further include a communication interface for communicating with other devices or communication networks.

In a fourth aspect, according to an embodiment of the present disclosure, a non-volatile computer readable storage medium for storing computer software instructions used for a lane line processing device is provided. The computer readable storage medium can include a program involved in executing the lane line processing method described above.

One of the above technical solutions has the following advantages or advantageous effects: by using the direction densities of the individual lane line points, lane line points in an image are divided into groups, the obtained groups are then more accurate, and thus the lane lines obtained by fitting are accurate, are not susceptible to image quality, and have high robustness.

The above summary is provided only for illustration, and is not intended to limit the present disclosure in any way. In addition to the illustrative aspects, embodiments and features described above, further aspects, embodiments and features of the present disclosure may be readily understood from the following detailed description with reference to the accompanying drawings.

BRIEF DESCRIPTION OF THE DRAWINGS

Unless otherwise specified, identical or similar parts or elements are denoted by identical reference signs throughout several figures of the accompanying drawings. The drawings are not necessarily drawn to scale. It should be understood that these drawings merely illustrate some embodiments of the present disclosure, and should not be construed as limiting the scope of the disclosure.

DETAILED DESCRIPTION

Hereinafter, only some exemplary embodiments are described. As can be appreciated by those skilled in the art, the described embodiments may be modified in various different ways without departing from the spirit or scope of the present disclosure. Accordingly, the drawings and the description should be considered as illustrative in nature instead of being restrictive.

Figure 1:
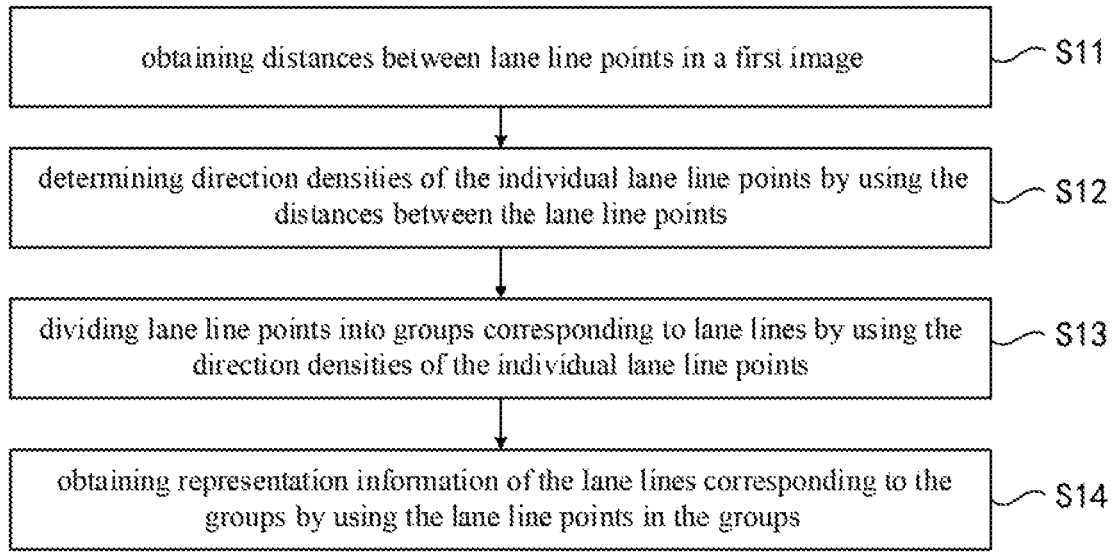
FIG. 1 is a flowchart depicting a lane line processing method according to an embodiment of the present disclosure.

FIG. 1 shows a flowchart of a lane line processing method according to an embodiment of the present disclosure. As depicted in FIG. 1, the method may include obtaining distances between lane line points in a first image at S11, determining direction densities of the individual lane line points by using the distances between the lane line points at S12, dividing lane line points into groups corresponding to lane lines by using the direction densities of the individual lane line points at S13, and obtaining representation information of the lane lines corresponding to the groups by using the lane line points in the groups at S14.

In embodiments, pixel points in the first image may be classified into pixel points of lane lines, which may be referred to as lane line points. Pixel points other than the lane line points in the first image may be referred to as non-lane line points.

In an implementation, S11 can include calculating distances between lane line points according to coordinates of the lane line points in the first image. A distance matrix can be generated by using the distances between lane line points, where an element in the distance matrix represents a distance between two lane line points in the first image. The distance matrix can be calculated first, so that it is possible to use the elements in the distance matrix directly when calculating the direction densities, thereby realizing a simple and quick calculation.

In an example, the distances between every two lane line points in an original image can be calculated to form a distance matrix. Assuming that there are N lane line points in the original image, the size of the distance matrix is then N*N.

For example, assuming the following distance matrix:

$$\begin{pmatrix} e_{11} & \dots & e_{1j} & \dots & e_{1N} \\ \dots & \dots & \dots & \dots & \dots \\ e_{i1} & \dots & e_{ij} & \dots & e_{iN} \\ \dots & \dots & \dots & \dots & \dots \\ e_{N1} & \dots & e_{Nj} & \dots & e_{NN} \end{pmatrix}.$$

The element $e_{ij}$ in the distance matrix can represent the Euclidean distance between the two lane line points i and j. It is noted that other methods, such as a block distance method, can also be used to calculate elements in the distance matrix.

Figure 2:
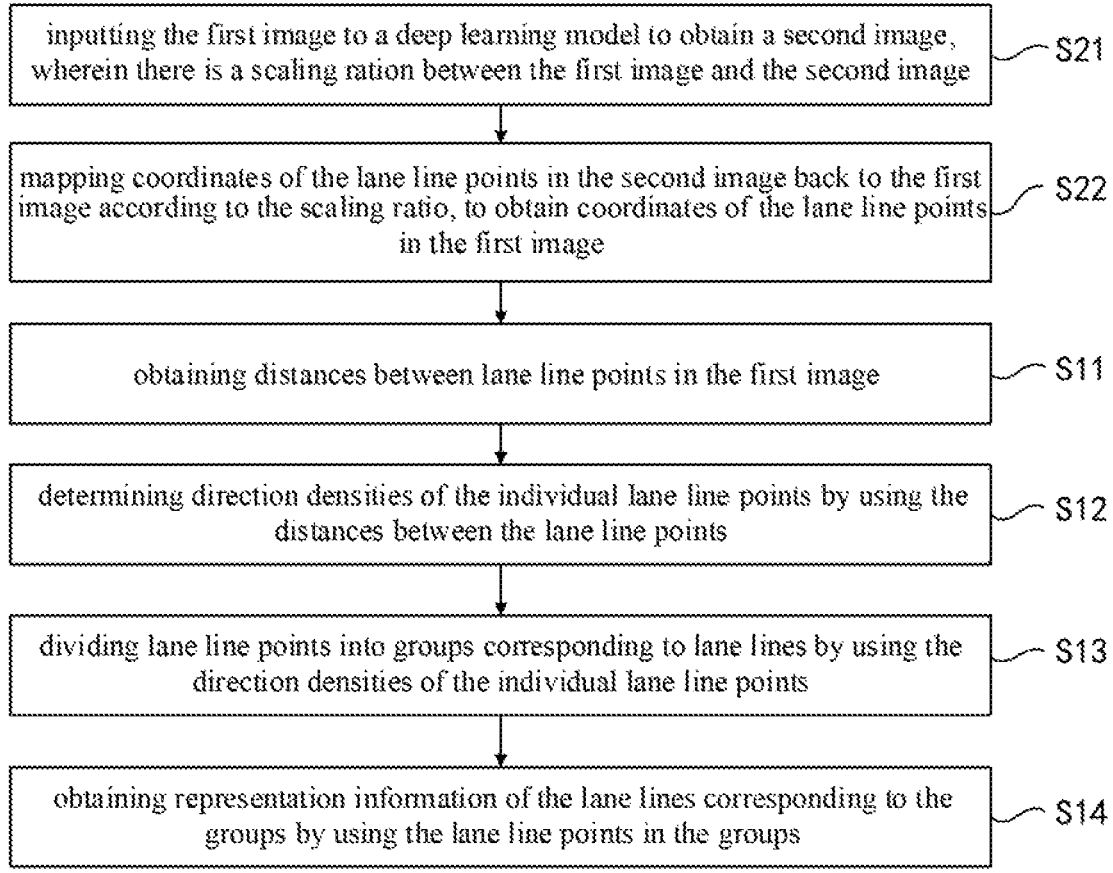
FIG. 2 is a flowchart depicting a lane line processing method according to an embodiment of the present disclosure.

In an implementation, as shown in FIG. 2, the method can further include inputting the first image to a deep learning model to obtain a second image at S21. There can be a scaling ratio between the first image and the second image, and the second image can comprise lane line points and non-lane line points obtained by identifying the first image in the deep learning model. At S22, coordinates of the lane line points in the second image can be mapped back to the first image according to the scaling ratio, to obtain coordinates of the lane line points in the first image.

Embodiments can be used to post-process the predicted output of a deep learning model. The deep learning model can be constructed by using a neural network, and certain sample images can be used for training such that a confidence can be obtained by using the deep learning model. The confidence can indicate that individual pixel points in the network output image belong to lane lines. A confidence threshold can be used for a classification. For example, a pixel point with a confidence greater than the threshold can be determined to be a lane line point, and a pixel point with a confidence less than or equal to the threshold can be determined to be a non-lane line point, etc. Subsequently, the identification results can be also used for continuous self-learning so as to optimize the model.

For example, a 2D image (an original image, i.e., a first image) such as a captured road image or the like can be scaled down by using the deep learning model, and the pixel points in the scaled-down image can be classified (0: non-lane line point; 1: lane line point). For each pixel point belonging to a lane line (referred to as a lane line point), the model can also provide the position of its predicted target point in a network output image (i.e., a second image). Then, coordinates of lane line points in the network output image can be mapped back to the original image.

Figure 3:
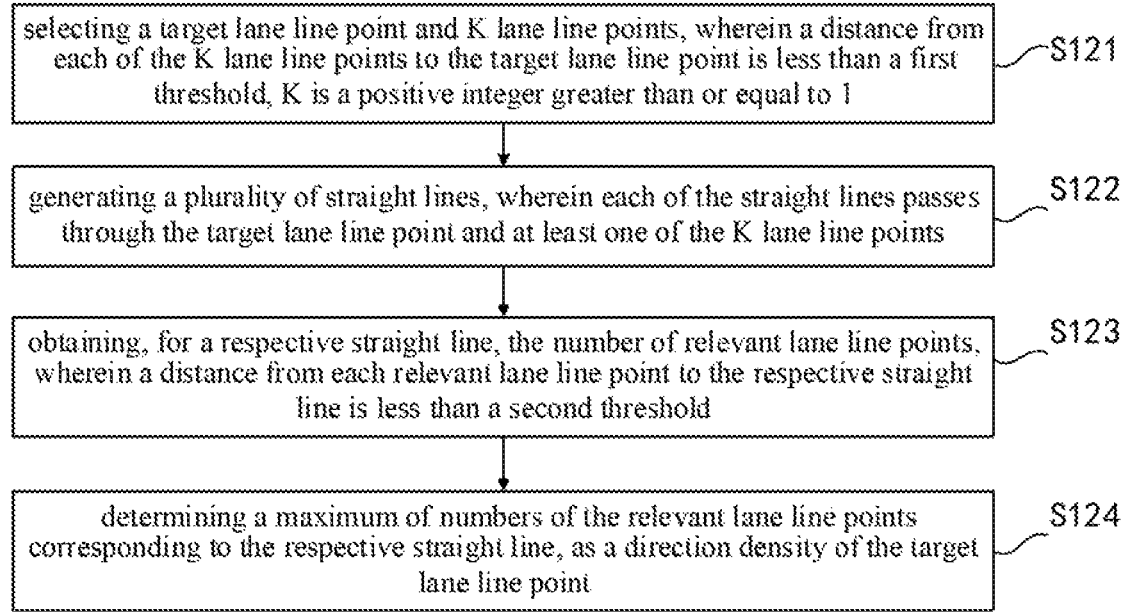
FIG. 3 is a flowchart depicting a lane line processing method according to an embodiment of the present disclosure.

In an embodiment, as shown in FIG. 3, S12 can further include selecting a target lane line point and K lane line points at S121 such that the distance from each of the K lane line points to the target lane line point is less than a first threshold, and K is a positive integer greater than or equal to 1. At S122, the method can include generating a plurality of straight lines, wherein each of the straight lines passes through the target lane line point and at least one of the K lane line points. At S123, the method can include obtaining, for a respective straight line, the number of relevant lane line points, wherein a distance from each relevant lane line point to the respective straight line is less than a second threshold.

At S124, the method can include determining a maximum of number of the relevant lane line points corresponding to the respective straight line, as a direction density of the target lane line point. As such, the straight line corresponding to the maximum can be determined, or selected, as the direction of the target lane line point. The points in the determination process of the direction densities of the target lane line point (i.e., points, the distance from each of them to the straight line is less than a second threshold) are determined as lane line points related to the direction of the target lane line point (referred to as relevant lane line points).

The direction density of each of the lane line points in the image can be calculated. The direction density can indicate the possibility that a lane line point approaches other lane line points in a certain direction. The first threshold and the second threshold may be set with reference to parameters such as the size of the first image, the number of lane line points in the image, and the like.

In an example, for each target lane line point P, K neighbor points Pnb_i may be selected from the distance matrix, such that the distance from each of the K neighbor points to the target lane line point P is less than the first threshold T1. For example, each element at the row corresponding to the point P is extracted from the distance matrix. If the extracted element is smaller than the first threshold T1 and the element represents the distance from the point P to the point P1, it can be determined that the point P1 is one neighbor point of the point P. In a similar manner, all neighbor points of the point P can be determined by extracting the elements at the row and the column corresponding to the point P from the distance matrix. With the size of the first threshold T1 being different, the number of neighbor points may vary.

Figure 4:
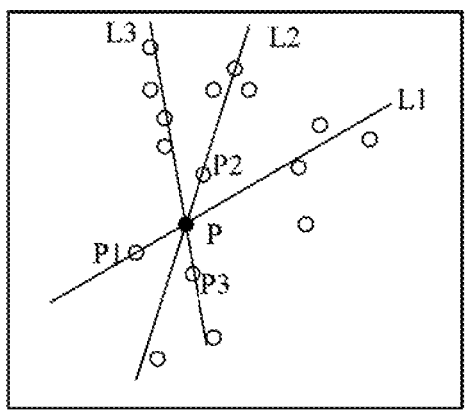
FIG. 4 is a schematic diagram showing the determination of direction densities in a lane line processing method according to an embodiment of the present disclosure.

Then, a straight line is determined by using the point P and its neighbor points Pnb_i, and the distances from other lane line points to the straight line are calculated. The number of the lane line points are determined, wherein the distance from one of the lane line points to the straight line is smaller than the second threshold value T2. The maximum of the numbers is taken as the direction density of the point P. This line can represent the direction of the point P. Each of the lane line points with the distance to the straight line being less than T2 is a relevant point of the straight line, and the relevant points approach the point P along the direction of the straight line. For example, as shown in FIG. 4, each small circle represents one lane line point, and the three points with distances from them to P being less than T1 are P1, P2, and P3, where the straight line L1 is determined by using P and P1, the straight line L2 is determined by using P and P2, and the straight line L3 is determined by using P and P3. The number of lane line points with the distance from it to L1 being less than the threshold value T2 is 3, the number of lane line points with the distance from it to L2 being less than the threshold value T2 is 4, and the number of lane line points with the distance from it to L3 being less than the threshold value T2 is 5. Because 5 is the largest one in the numbers of the lane line points, L3 is determined as the direction density of the point P.

Figure 5:
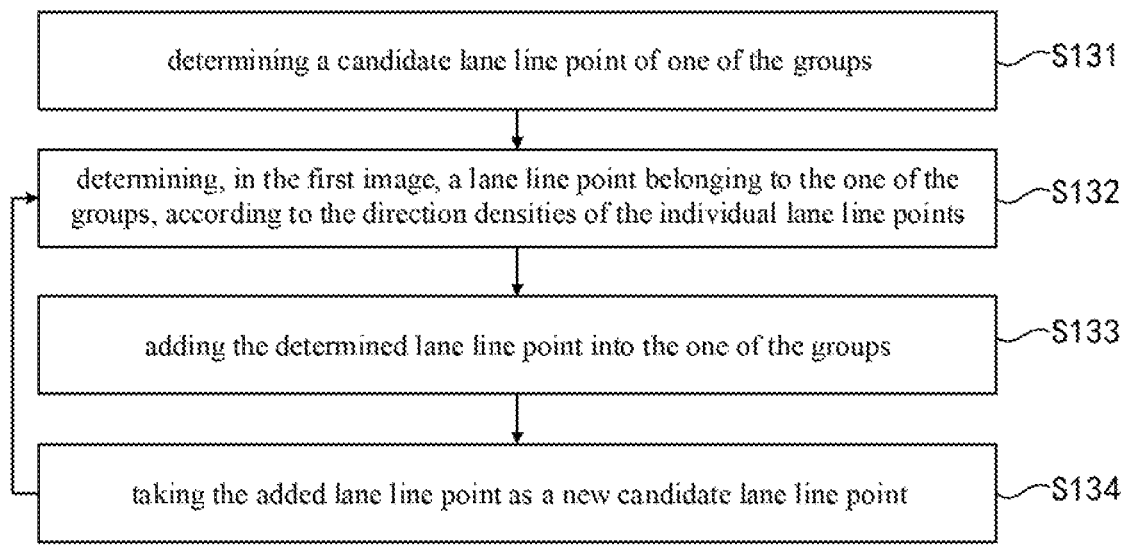
FIG. 5 is a flowchart depicting a lane line processing method according to an embodiment of the present disclosure.

In an embodiment, as shown in FIG. 5, S13 can include determining a candidate lane line point of one of the groups at S131, determining, in the first image, a lane line point belonging to the one of the groups, according to the direction densities of the individual lane line points at S132, adding the determined lane line point into the one of the groups at S133, and, at S134, taking the added lane line point as a new candidate lane line point, and continuing the determining a lane line point belonging to the one of the groups (i.e., S132), until no lane line point belonging to the one of the groups is determined.

In an example, S132 may include: selecting M lane line points from the first image, wherein a distance from each of the M lane line points to the candidate lane line point is less than a third threshold, M is a positive integer greater than or equal to 1; and determining lane line points belonging to the one of the groups according to the direction densities of the M lane line points.

The determination of lane line points belonging to the one of the groups according to the direction densities of the M lane line points can be completed in many ways.

For example, a lane line point having the maximum direction density among the M lane line points can be selected as the lane line point belonging to the one of the groups.

For another example, relevant lane line points of a straight line corresponding to a direction density of the candidate lane line point are obtained from the M lane line points. The distance from each of the relevant points to the straight line is less than a second threshold. A point having the maximum direction density can be selected from the obtained relevant lane line points as the lane line point belonging to the one of the groups.

Figure 6:
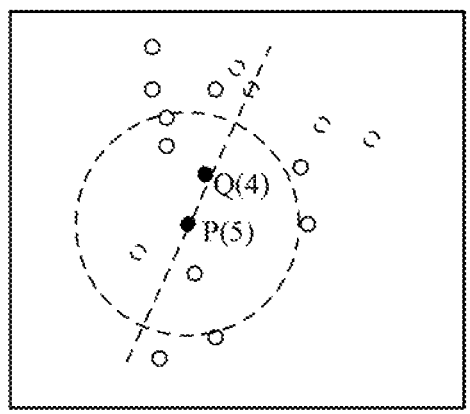
FIG. 6 is a schematic diagram depicting the grouping in a lane line processing method according to an embodiment of the present disclosure.

In an example, a candidate lane line point P is selected, and a lane line point Q having the maximum direction density is selected from the lane line points with the distances between them to the point P being less than the threshold T3 (assuming T3 is 100 pixels). The point Q is selected as a new candidate lane line point, and points that satisfy the same condition are selected until no point satisfying the same condition is determined. All points determined by this way are divided into one group. This grouping process is repeated until all lane line points are processed. In this way, a certain number of groups of points can be obtained. For example, as shown in FIG. 6, each small circle represents a lane line point, and it is assumed that the candidate lane line point P has a direction density of 5. The dashed circle indicates a region in which the pixel points with the distance from them to the point P being less than the threshold T3 are located. The direction density of each lane line point in this region can be calculated by using the method discussed above with reference to FIG. 4.

Assuming that the direction densities of a plurality of lane line points in the region are 2, 1, 3 and 4 respectively, the point Q having the maximum direction density (the direction density being 4) can be selected. In addition, in combination with the direction of the point P, the point having the maximum direction density can also be selected from the relevant points (with the distance from them to the straight line in FIG. 6 being less than the threshold T2) of the straight line (i.e., the direction of P) corresponding to the direction density of the point P in the region of FIG. 4.

In an embodiment, the method can further include merging the lane line points in one of the groups. Then, the merged groups can be taken as the final grouping result.

According to the present embodiment, adjacent groups can be merged by using the principle of spatial adjacency between groups. There are many ways for merging, examples of which are given below:

Example 1: the merging is performed if the distance between two groups (for example, the minimum of the distances between the points in the two groups can be calculated as the distance between the two groups) is less than a preset threshold.

Figure 7:
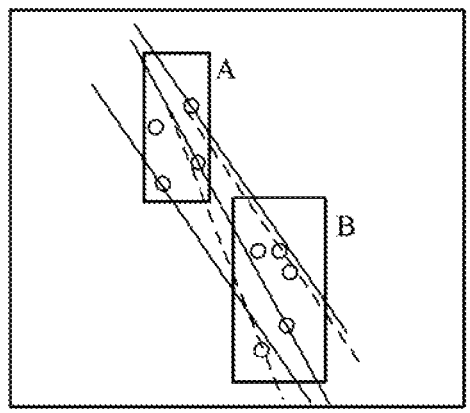
FIG. 7 is a schematic diagram depicting the merging and grouping in a lane line processing method according to an embodiment of the present disclosure.

Example 2: a set of neighbor direction points of each group can be calculated by using the direction density information of the points in each group. If the overlap degree of the set of neighbor direction points between two groups is higher than a threshold, the two groups are merged. For example, with reference to FIG. 7, assuming that there are a plurality of points in group A and group B, wherein the straight lines corresponding to the direction densities of these points pass through the plurality of points in group A and group B, then it can be determined that group A and group B are overlapped. Assuming that the overlap degree threshold is 3, if there are three points in group A (the straight line corresponding to the direction density of the point passes through group B) and there are two points in group B (the straight line corresponding to the direction density of the point passes through group A), the overlap degree of the two groups is 5, which is greater than the threshold. Thus, the two groups can be merged.

In an embodiment, S14 can includes selecting, for each group, a plurality of lane line points, and performing polynomial fitting on coordinates of the selected plurality of lane line points in the first image, to obtain a polynomial curve of a lane line corresponding to the group.

An example of the polynomial fitting process includes: assuming a polynomial $y=ax^3+bx^2+cx+d$ is given. For each group, the coordinates (x, y) of a plurality of (e.g., 4 or more) lane line points in the group in the original image may be substituted into the polynomial. The polynomial can then solved by a least squares or other regression method to obtain the values of the coefficients a, b, c, and d of the polynomial.

The given polynomial is only an example rather than being limiting, and other forms of polynomials can be used as desired by the various embodiments.

In an embodiment, S14 can further includes determining coordinates of start points and/or coordinates of end points of the lane line by using the polynomial curve of the lane line. After the polynomial curve of the lane line corresponding to a certain group is obtained through fitting, information such as the start point and the end point of the lane line can be determined according to the curve. Specifically, in combination with the coordinates of the lane line points in the group and the curve of the lane line corresponding to the group, the start point and the end point information can be determined by using the minimum and the maximum of y (and/or x) among these points.

Figure 8A:
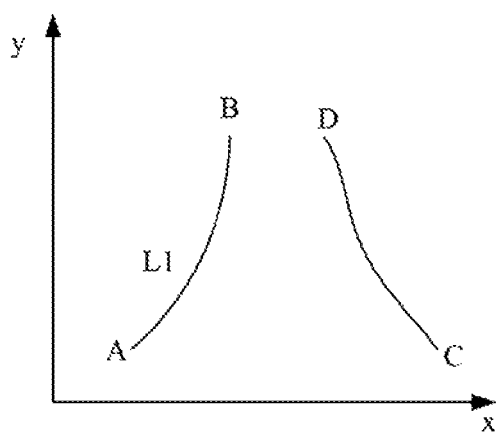
FIG. 8a and FIG. 8b are schematic diagrams depicting the determination of start and end points by using curves in a lane line processing method according to an embodiment of the present disclosure.

For example, as shown in FIG. 8a, a curve L1 is obtained by fitting a certain group, wherein the coordinate of the start point A of L1 is determined by using the minimum of y (and/or x) in the group, and the coordinate of the end point B of L1 is determined by using the maximum and the minimum of y (and/or x). A curve L2 is obtained by fitting a certain group, wherein the coordinate of the start point C of L2 is determined by using the minimum of x (the maximum value of y) in the group, and the coordinate of the end point D of L2 is determined by using the maximum of x (the minimum value of y) in the group.

Figure 8B:
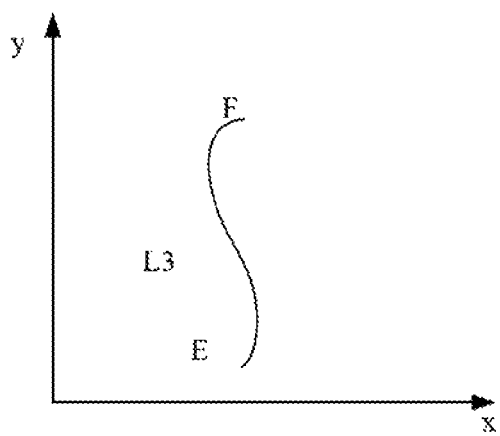

In another example, as shown in FIG. 8b, a curve L3 is obtained by fitting a certain group, wherein the coordinate of the start point E of L3 is determined by using the minimum of y in the group, and the coordinate of the end point F of L3 is determined by using the maximum of y.

In the embodiments of the present disclosure, by using the direction densities of the individual lane line points, lane line points in an image are divided into groups, the obtained groups are then more accurate, and thus the lane lines obtained by fitting are more accurate, are less susceptible to image quality issues, and have high robustness.

Figure 9:
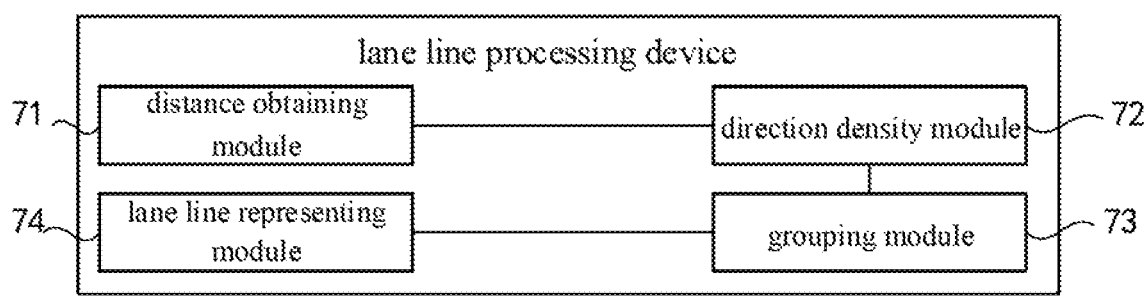
FIG. 9 is a block diagram depicting a structure of a lane line processing device according to an embodiment of the present disclosure.

FIG. 9 is a block diagram depicting a structure of a lane line processing device according to an embodiment of the present disclosure. A distance obtaining module 71 can be configured to obtain distances between lane line points in a first image. A direction density module 72 can be configured to determine direction densities of the individual lane line points by using the distances between the lane line points. A grouping module 73 can be configured to divide lane line points into groups corresponding to lane lines by using the direction densities of the individual lane line points. A lane line representing module 74 can be configured to obtain representation information of the lane lines corresponding to the groups by using the lane line points in the groups. The representation information can indicate, show, or express, the directions, coordinates, or other information of the lane lines.

Figure 10:
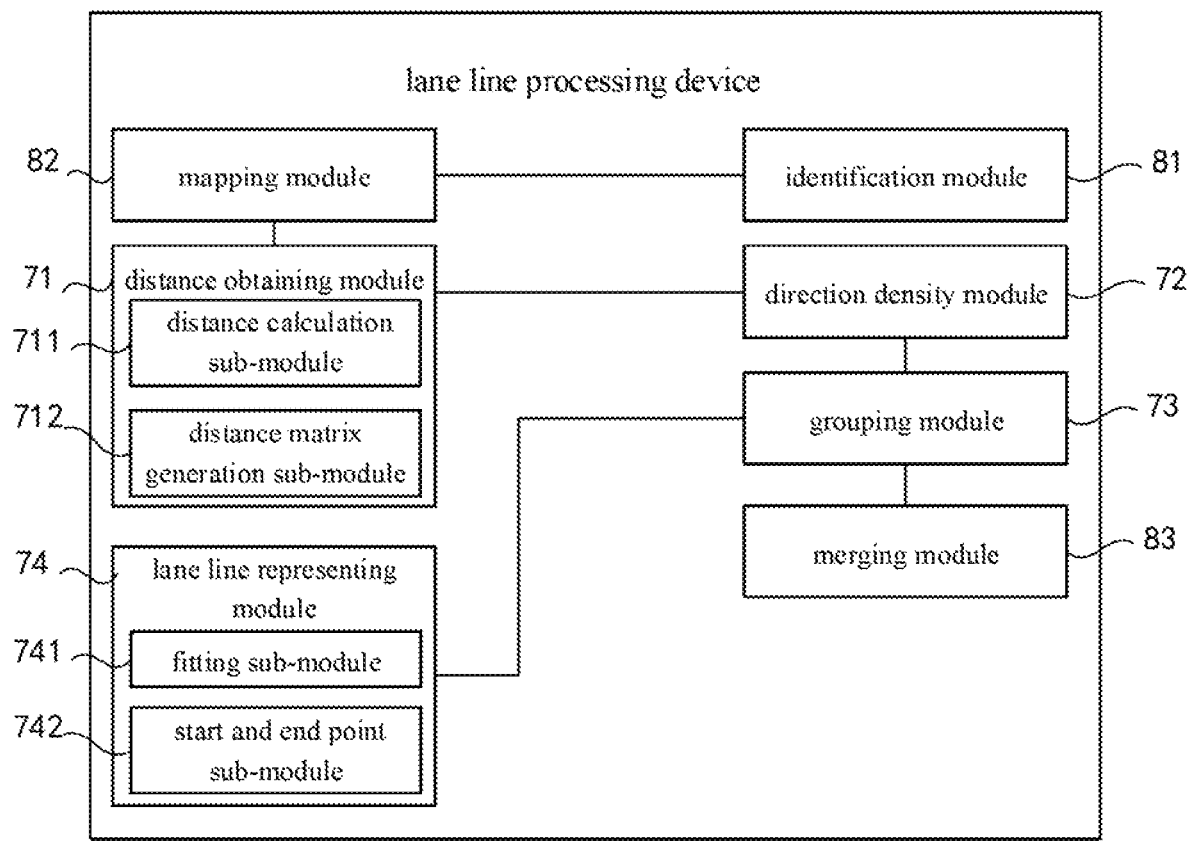
FIG. 10 is a block diagram depicting a structure of a lane line processing device according to an embodiment of the present disclosure.

In an embodiment, as shown in FIG. 10, the device can further include an identification module 81, configured to input the first image to a deep learning model to obtain a second image, wherein there is a scaling ration between the first image and the second image, and wherein the second image comprises lane line points and non-lane line points obtained by identifying the first image in the deep learning model and a mapping module 82, configured to map coordinates of the lane line points in the second image back to the first image according to the scaling ratio, to obtain coordinates of the lane line points in the first image.

In an embodiment, the direction density module 72 can be further configured to select a target lane line point and K lane line points, wherein a distance from each of the K lane line points to the target lane line point is less than a first threshold, K is a positive integer greater than or equal to 1, generate a plurality of straight lines, wherein each of the straight lines passes through the target lane line point and at least one of the K lane line points, obtain, for a respective straight line, the number of relevant lane line points, wherein a distance from each relevant lane line point to the respective straight line is less than a second threshold, and determine a maximum of numbers of the relevant lane line points corresponding to the respective straight line, as a direction density of the target lane line point.

In an embodiment, the grouping module 73 can be further configured to determine a candidate lane line point of one of the groups, determine, in the first image, a lane line point belonging to the one of the groups, according to the direction densities of the individual lane line points add the determined lane line point into the one of the groups, take the added lane line point as a new candidate lane line point, and continue to determine a lane line point belonging to one of the groups, until no lane line point belonging to one of the groups is can be found.

Determining, in the first image, a lane line point belonging to the one of the groups, according to the direction densities of the individual lane line points can comprise selecting M lane line points from the first image, wherein a distance from each of the M lane line points to the candidate lane line point is less than a third threshold, M is a positive integer greater than or equal to 1; and determining lane line points belonging to the one of the groups according to the direction densities of the M lane line points.

The determination of lane line points belonging to the one of the groups according to the direction densities of the M lane line points can be completed in many ways.

For example, a lane line point having the maximum direction density among the M lane line points is determined as the lane line point belonging to the one of the groups.

For another example, relevant lane line points of a straight line corresponding to a direction density of the candidate lane line point are obtained from the M lane line points. The distance from each of the relevant points to the straight line is less than a second threshold. A point having the maximum direction density is selected from the obtained relevant lane line points as the lane line point belonging to the one of the groups.

In an implementation, the lane line representing module 74 includes:

a fitting sub-module 741, configured to select, for each group, a plurality of lane line points; and performing polynomial fitting on coordinates of the selected plurality of lane line points in the first image, to obtain a polynomial curve of a lane line corresponding to the group.

In an implementation, the lane line representing module 74 further includes:

a start and end point sub-module 742, configured to determine coordinates of start points and/or coordinates of end points of the lane line by using the polynomial curve of the lane line.

In an implementation, the device further includes:

a merging module 83, configured to merge the lane line points in one of the groups.

In an implementation, the distance obtaining module 71 includes:

a distance calculation sub-module 711, configured to distances between lane line points according to coordinates of the lane line points in the first image; and a distance matrix generation sub-module 712, configured to generate a distance matrix by using the distances between lane line points, wherein an element in the distance matrix represents a distance between two lane line points in the first image.

The functions of various modules in the devices according to embodiments of the present disclosure may refer to the corresponding description of the above described method, and a repeated description is not given herein.

Figure 11:
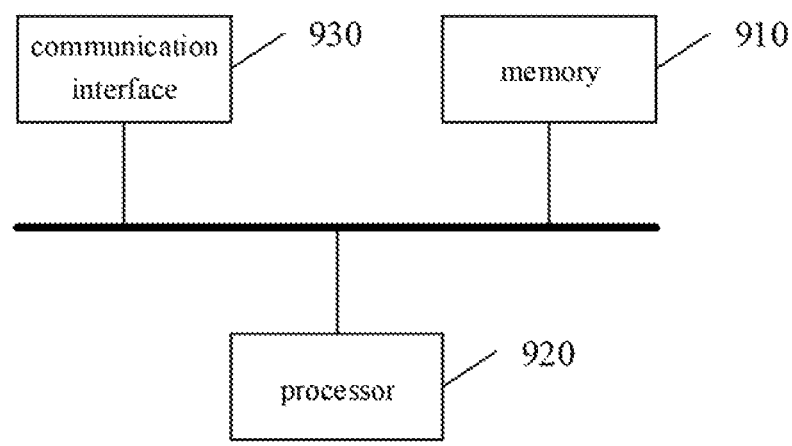
FIG. 11 is a block diagram depicting a structure of a lane line processing device according to an embodiment of the present disclosure.

FIG. 11 is a block diagram showing a structure of a lane line processing device according to an embodiment of the present disclosure. As shown in FIG. 11, the device includes a memory 910 and a processor 920, wherein a computer program that can run on the processor 920 is stored in the memory 910. The processor 920 executes the computer program to implement the lane line processing method according to the above embodiments. The number of the memory 910 and the processor 920 may each be one or more.

The device/apparatus/terminal/server further includes:

a communication interface 930, configured to communicate with an external device to perform data interaction and transmission.

The memory 910 may include a high-speed RAM memory, or may also include a non-volatile memory, such as at least one disk memory.

If the memory 910, the processor 920 and the communication interface 930 are implemented independently, the memory 910, the processor 920 and the communication interface 930 may be connected to each other via a bus so as to realize mutual communication. The bus may be an industry standard architecture (ISA) bus, a peripheral component interconnect (PCI) bus, an extended industry standard architecture (EISA) bus, or the like. The bus may be categorized into an address bus, a data bus, a control bus or the like. For ease of illustration, only one bold line is shown in FIG. 11 to represent the bus, but it does not mean that there is only one bus or only one type of bus.

Optionally, in a specific implementation, if the memory 910, the processor 920 and the communication interface 930 are integrated on one chip, then the memory 910, the processor 920 and the communication interface 930 can complete mutual communication through an internal interface.

According to an embodiment of the present disclosure, it is provided a non-volatile computer readable storage medium having a computer program stored thereon which, when executed by a processor, implements the method described in any one of the above embodiments.

In the present specification, the description referring to the terms "one embodiment", "some embodiments", "an example", "a specific example", or "some examples" or the like means that the specific features, structures, materials, or characteristics described in connection with the embodiment or example are contained in at least one embodiment or example of the present disclosure. Moreover, the specific features, structures, materials, or characteristics described may be combined in a suitable manner in any one or more of the embodiments or examples. In addition, various embodiments or examples described in the specification as well as features of different embodiments or examples may be united and combined by those skilled in the art, as long as they do not contradict with each other.

Furthermore, terms "first" and "second" are used for descriptive purposes only, and are not to be construed as indicating or implying relative importance or implicitly indicating the number of recited technical features. Thus, a feature defined with "first" and "second" may include at least one said feature, either explicitly or implicitly. In the description of the present disclosure, the meaning of "a plurality" is two or more than two, unless otherwise explicitly or specifically indicated.

Any process or method described in the flowcharts or described otherwise herein may be construed as representing a module, segment or portion including codes for executing one or more executable instructions for implementing particular logical functions or process steps. The scope of the preferred embodiments of the present disclosure includes additional implementations in which functions may be implemented in an order that is not shown or discussed, including in a substantially concurrent manner or in a reverse order based on the functions involved. All these should be understood by those skilled in the art to which the embodiments of the present disclosure belong.

The logics and/or steps represented in the flowcharts or otherwise described herein for example may be considered as an ordered list of executable instructions for implementing logical functions. They can be specifically embodied in any computer readable medium for use by an instruction execution system, apparatus or device (e.g., a computer-based system, a system including a processor, or another system that can obtain instructions from the instruction execution system, apparatus or device and execute these instructions) or for use in conjunction with the instruction execution system, apparatus or device. For the purposes of the present specification, "computer readable medium" can be any means that can contain, store, communicate, propagate or transmit programs for use by an instruction execution system, apparatus or device or for use in conjunction with the instruction execution system, apparatus or device. More specific examples (non-exhaustive list) of computer readable storage medium at least include: electrical connection parts (electronic devices) having one or more wires, portable computer disk cartridges (magnetic devices), random access memory (RAM), read only memory (ROM), erasable programmable read-only memory (EPROM or flash memory), fiber optic devices, and portable read only memory (CDROM). In addition, the computer-readable storage medium may even be a paper or other suitable medium on which the programs can be printed. This is because for example the paper or other medium can be optically scanned, followed by editing, interpretation or, if necessary, other suitable ways of processing so as to obtain the programs electronically, which are then stored in a computer memory.

It should be understood that individual portions of the present disclosure may be implemented in the form of hardware, software, firmware, or a combination thereof. In the above embodiments, a plurality of steps or methods may be implemented using software or firmware stored in a memory and executed by a suitable instruction execution system. For example, if they are implemented in hardware, as in another embodiment, any one or a combination of the following techniques known in the art may be used: discrete logic circuits having logic gate circuits for implementing logic functions on data signals, application-specific integrated circuits having suitable combined logic gate circuits, programmable gate arrays (PGA), field programmable gate arrays (FPGA), etc.

Those skilled in the art may understand that all or part of the steps carried in the method of the foregoing embodiments may be implemented by using a program to instruct the relevant hardware, and the program may be stored in a non-volatile computer readable storage medium. When executed, the program includes one or a combination of the steps in the method embodiments.

In addition, individual functional units in various embodiments of the present disclosure may be integrated in one processing module, or individual units may also exist physically and independently, or two or more units may also be integrated in one module. The above integrated module can be implemented in the form of hardware or in the form of a software functional module. The integrated module may also be stored in a non-volatile computer readable storage medium if it is implemented in the form of a software function module and sold or used as a stand-alone product. The storage medium may be a read-only memory, a magnetic disk or an optical disk, etc.

The above description only relates to specific embodiments of the present disclosure, but the scope of protection of the present disclosure is not limited thereto, and any of those skilled in the art can readily contemplate various changes or replacements within the technical scope of the present disclosure. All these changes or replacements should be covered by the scope of protection of the present disclosure. Therefore, the scope of protection of the present disclosure should be determined by the scope of the appended claims.

What is claimed is:

1. A lane line processing method, comprising:
    obtaining distances between lane line points in a first image;
    determining direction densities of the individual lane line points by using the distances between the lane line points, each direction density indicating the probability that an individual lane line point approaches other lane line points in a direction;
    dividing the lane line points into groups corresponding to lane lines by using the direction densities of the individual lane line points; and
    obtaining representation information of the lane lines corresponding to the groups by using the lane line points in the groups.

2. The method of claim 1, further comprising:
    inputting the first image to a deep learning model to obtain a second image, wherein there is a scaling ratio between the first image and the second image, and wherein the second image comprises lane line points and non-lane line points obtained by identifying the first image in the deep learning model; and
    mapping coordinates of the lane line points in the second image back to the first image according to the scaling ratio, to obtain coordinates of the lane line points in the first image.

3. The method of claim 1, wherein determining direction densities of the individual lane line points by using the distances between the lane line points comprises:
    selecting a target lane line point and K lane line points, wherein a distance from each of the K lane line points to the target lane line point is less than a first threshold, K is a positive integer greater than or equal to 1;
    generating a plurality of straight lines, wherein each of the straight lines passes through the target lane line point and at least one of the K lane line points;
    obtaining, for a respective straight line, the number of relevant lane line points, wherein a distance from each relevant lane line point to the respective straight line is less than a second threshold; and
    determining a maximum of numbers of the relevant lane line points corresponding to the respective straight line, as a direction density of the target lane line point.

4. The method of claim 1, wherein dividing the lane line points into groups corresponding to lane lines by using the direction densities of the individual lane line points comprises:
    determining a candidate lane line point of a selected group of the groups;
    determining, in the first image, a lane line point belonging to the selected group, according to the direction densities of the individual lane line points;
    adding the determined lane line point into the selected group; and
    taking the added lane line point as a new candidate lane line point, and continuing the determining a lane line point belonging to the selected group, until no lane line point belonging to the selected group, is determined;
    wherein determining, in the first image, a lane line point belonging to the selected group, according to the direction densities of the individual lane line points comprises: selecting M lane line points from the first image, wherein a distance from each of the M lane line points to the candidate lane line point is less than a third threshold, M is a positive integer greater than or equal to 1; and determining lane line points belonging to the selected group according to the direction densities of the M lane line points.

5. The method of claim 4, wherein determining, in the first image, a lane line point belonging to the selected group, according to the direction densities of the M lane line points comprises:
    determining a lane line point having the maximum direction density among the M lane line points as the lane line point belonging to the selected group; or
    obtaining, from the M lane line points, relevant lane line points of a straight line corresponding to a direction density of the candidate lane line point, and selecting a point having the maximum direction density from the obtained relevant lane line points as the lane line point belonging to the selected group.

6. The method of claim 1, wherein obtaining representation information of the lane lines corresponding to the groups by using the lane line points in the groups comprises:
    selecting, for each group, a plurality of lane line points; and performing polynomial fitting on coordinates of the selected plurality of lane line points in the first image, to obtain a polynomial curve of a lane line corresponding to the group.

7. The method of claim 6, wherein obtaining representation information of the lane lines corresponding to the groups by using the lane line points in the groups further comprises:
    determining coordinates of start points and/or coordinates of end points of the lane line by using the polynomial curve of the lane line.

8. The method of claim 1, further comprising:
merging the lane line points in one of the groups.

9. The method of claim 1, wherein obtaining distances between lane line points in a first image comprises:
calculating distances between lane line points according to coordinates of the lane line points in the first image; and
generating a distance matrix by using the distances between lane line points, wherein an element in the distance matrix represents a distance between two lane line points in the first image.

10. A non-volatile computer readable storage medium having computer programs stored thereon, wherein the programs, when executed by a processor, cause the processor to implement the method of claim 1.

11. A lane line processing device, comprising:
one or more processors;
a storage device for storing one or more programs; wherein
the one or more programs are executed by the one or more processors to enable the one or more processors to:
obtain distances between lane line points in a first image;
determine direction densities of the individual lane line points by using the distances between the lane line points, each direction density indicating the probability that an individual lane line point approaches other lane line points in a direction;
divide lane line points into groups corresponding to lane lines by using the direction densities of the individual lane line points; and
obtain representation information of the lane lines corresponding to the groups by using the lane line points in the groups.

12. The device of claim 11, wherein the one or more programs are executed by the one or more processors to enable the one or more processors to:
input the first image to a deep learning model to obtain a second image, wherein there is a scaling ratio between the first image and the second image, and wherein the second image comprises lane line points and non-lane line points obtained by identifying the first image in the deep learning model; and
map coordinates of the lane line points in the second image back to the first image according to the scaling ratio, to obtain coordinates of the lane line points in the first image.

13. The device of claim 12, wherein the one or more programs are executed by the one or more processors to enable the one or more processors to:
select a target lane line point and K lane line points, wherein a distance from each of the K lane line points to the target lane line point is less than a first threshold, K is a positive integer greater than or equal to 1;
generate a plurality of straight lines, wherein each of the straight lines passes through the target lane line point and at least one of the K lane line points;
obtain, for a respective straight line, the number of relevant lane line points, wherein a distance from each relevant lane line point to the respective straight line is less than a second threshold; and
determine a maximum of numbers of the relevant lane line points corresponding to the respective straight line, as a direction density of the target lane line point.

14. The device of claim 13, wherein the one or more programs are executed by the one or more processors to enable the one or more processors to:
determine a candidate lane line point of a selected group of the groups;
determine, in the first image, a lane line point belonging to the selected group, according to the direction densities of the individual lane line points;
add the determined lane line point into the selected groups; and
take the added lane line point as a new candidate lane line point, and continue the determining a lane line point belonging to the selected group, until no lane line point belonging to the selected group is determined; wherein
the one or more programs are executed by the one or more processors to enable the one or more processors further to: select M lane line points from the first image, wherein a distance from each of the M lane line points to the candidate lane line point is less than a third threshold, M is a positive integer greater than or equal to 1; and determine lane line points belonging to the selected group according to the direction densities of the M lane line points.

15. The device of claim 11, wherein the one or more programs are executed by the one or more processors to enable the one or more processors to:
select, for each group, a plurality of lane line points; and
perform polynomial fitting on coordinates of the selected plurality of lane line points in the first image, to obtain a polynomial curve of a lane line corresponding to the group.

16. The device of claim 15, wherein the one or more programs are executed by the one or more processors to enable the one or more processors to:
determine coordinates of start points and/or coordinates of end points of the lane line by using the polynomial curve of the lane line.

17. The device of claim 11, wherein the one or more programs are executed by the one or more processors to enable the one or more processors to:
calculate distances between lane line points according to coordinates of the lane line points in the first image; and
generate a distance matrix by using the distances between lane line points, wherein an element in the distance matrix represents a distance between two lane line points in the first image.

* * * * *